July 17, 1962

C. R. CLAYTON 3,045,096

TOILET PAN SEAT UNITS

Filed Jan. 4, 1960

3 Sheets-Sheet 1

INVENTOR
CYRIL R CLAYTON
By

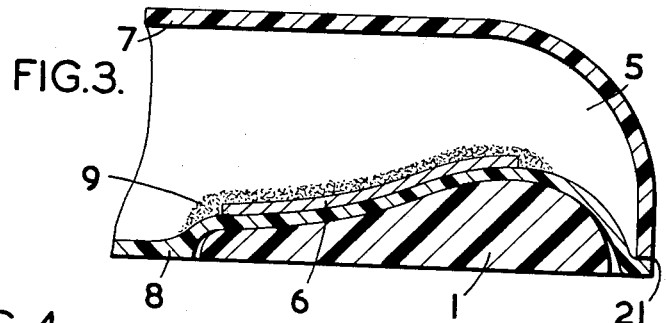
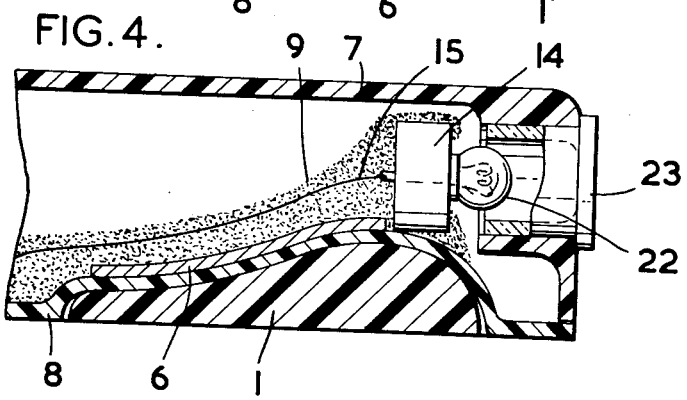
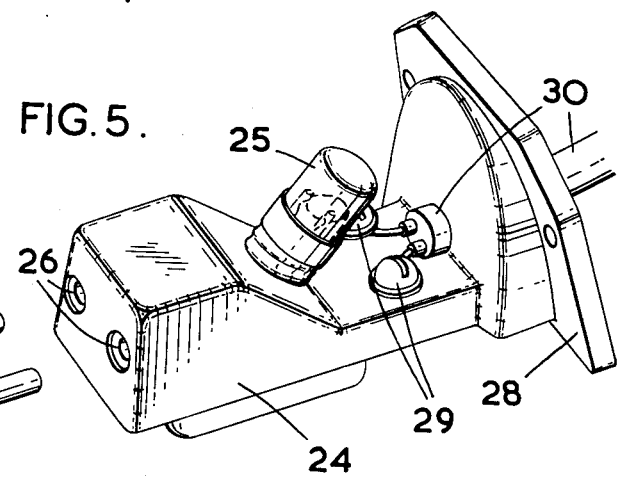

July 17, 1962  C. R. CLAYTON  3,045,096
TOILET PAN SEAT UNITS

Filed Jan. 4, 1960  3 Sheets-Sheet 3

INVENTOR
CYRIL R CLAYTON
By

United States Patent Office 3,045,096
Patented July 17, 1962

3,045,096
TOILET PAN SEAT UNITS
Cyril Reginald Clayton, White Oak, Branksome Road,
St. Leonards-on-Sea, England
Filed Jan. 4, 1960, Ser. No. 349
Claims priority, application Great Britain Jan. 5, 1959
2 Claims. (Cl. 219—19)

This invention relates to means for indirectly warming a toilet-pan seat by an electrical heating device, and has for its object to achieve this by means of a heating element incorporated within a cover adapted to overlie the seat, whereby the seat will acquire or will be maintained at about human body temperature to afford comfort when the toilet pan is used. A further object of the invention, is to provide means for switching off the heating element by the operation of bringing a seat cover to its fully raised position, so that in the interests of safety, the seat cover incorporating the heating element is isolated from the electrical system when the toilet pan is in use.

According to the invention there is provided a toilet-pan seat unit incorporating a seat and a seat-warming raisable rigid seat cover hingedly carried by a mounting associated with said seat, an electric heating element incorporated with said seat cover, said heating element being embedded in a hard-setting mouldable substance, an electrical connector detachably fitting into said seat cover, said connector establishing electrical connection to said heating element, and a mercury switch incorporated with said electrical connector, said switch being arranged to switch on said heating element by lowering said seat cover.

Figure 1:
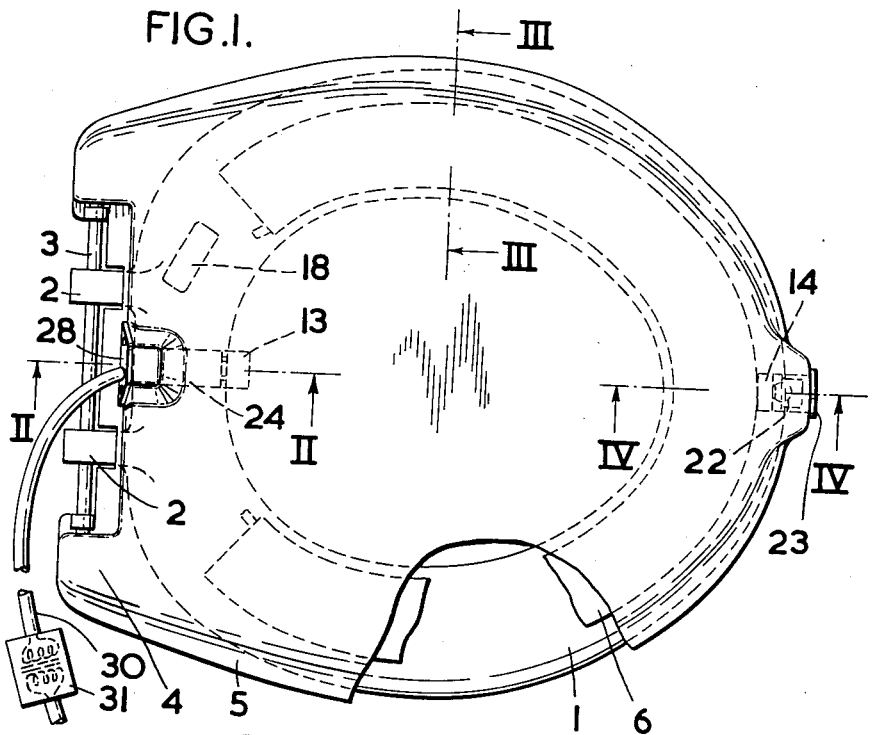
Figure 2:
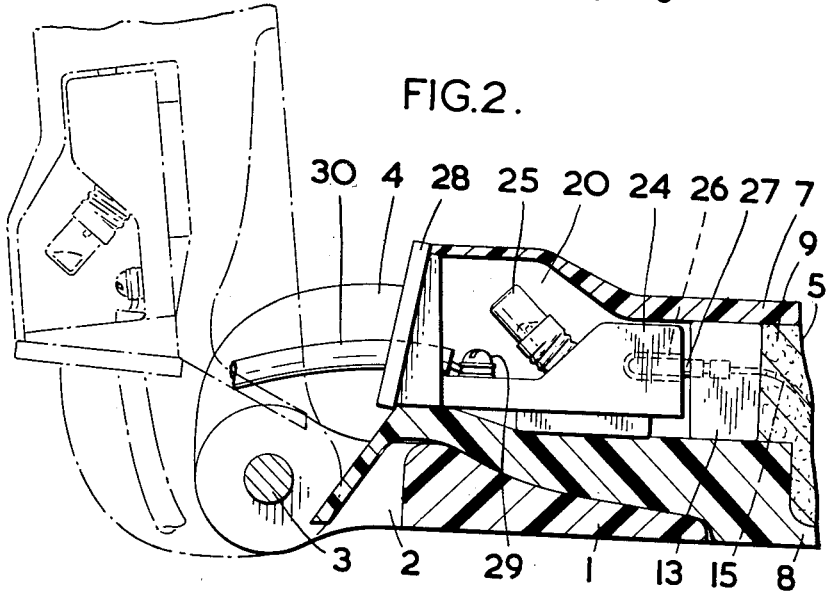
Figure 6:
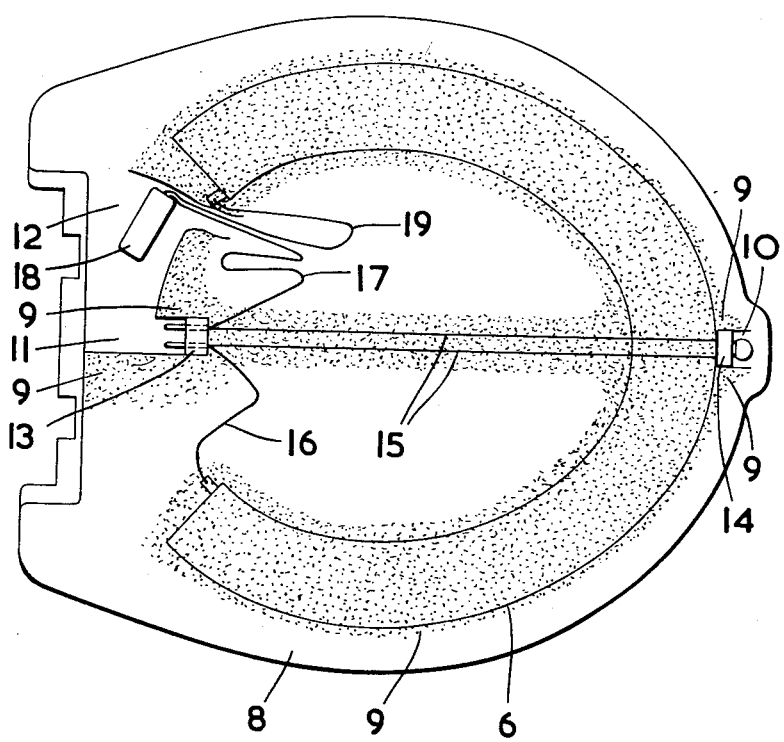

Embodiments of the invention will now be described and are shown in the accompanying drawings wherein:

FIGURE 1 is a plan view of a seat unit in which the heating element is incorporated in the seat cover, FIGURES 2, 3 and 4 are cross sections on lines II—II, III—III and IV—IV respectively in FIGURE 1, FIGURE 5 is a rear perspective view of a mercury switch element, FIGURE 6 is a plan view of the lower section of the seat cover showing how various parts are arranged and bonded thereto before securing the upper section of said cover in place.

In the embodiment of the invention shown in the drawings a toilet seat unit comprises a seat 1 having lugs 2 carrying a rod 3 having end portions fitted into rear lug portions 4 of a seat cover 5, the lugs 2 or lug portions 4 serving as journal bearings for the rod 3, whereby the seat cover 5 is hingedly carried by the seat 1. It will be understood that the seat cover 5 may be hingedly mounted on the seat 1 in any other convenient manner.

The seat cover 5 has an electric heating element 6 housed therein, this heating element having the same general configuration as the seat 1 and having a position in correspondence with that of said seat when the cover is in a lowered position in contact with said seat.

The said seat cover 5 incorporates a dished upper section 7 and a lower plate-like section 8 both moulded from synthetic plastics material, these sections being bonded together at their perimeters.

The building up of the assembly comprising the sections 7 and 8 and the parts housed between them, is carried out by laying the heating element 6 on to the section 8 (FIGURE 6) and securing said heating element in place by laying over said heating element and adjacent surface portions of the section 8 a layer of glass-fibre 9 which is treated with liquid resin to form a hard glass-fibre body which becomes bonded to the said parts 6 and 8. At the front of the section 8 the glass-fibre 9 is similarly built up to define a space 10 between mutually-opposed portions thereof. At the rear of section 8 other glass-fibre is similarly built up as also denoted by reference 9 to define a space 11 from which laterally extends a space 12. In building up the glass-fibre to form the space 11, the said glass-fibre is pressed up against the sides of an electrical connector block 13, thereby to bond said block in position on section 8. Likewise in forming the space 10 the glass-fibre is pressed up against a lampholder 14, thereby to secure said lampholder in position on section 8. The connector block 13 has a pair of contact pins which are electrically connected to the lampholder 14 by wires 15 which are bedded into another body of glass-fibre 9 built up as aforesaid on section 8. One of the pins of connector block 13 is directly connected by a lead 16 to one end of the electric heating element 6. The other pin of said connector block 13 is connected by a length of flexible covered wire 17 to a thermostat 18, another flexible covered wire 19 serving to connect the thermostat to the other end of heating element 6. The thermostat 18 is not secured in place on section 8; furthermore the wires 17 and 19 are left free except in the locality of their ends which are anchored to the connector block 13 and heating element 6 respectively, the free portions of said wires 17 and 19 being of sufficient length to permit the thermostat to be withdrawn from the cover via a tunnel 20 of section 7 (FIGURE 2), should this be necessary for inspection or replacement of said thermostat. After the resin-treated glass-fibre has set and has therefore bonded the parts 6, 13, 14 and 15 to section 8 the upper section 7 is laid over said section 8, and is secured thereto while disposed with its perimeter flush with the periphery of said section 8, the bonding together of said sections 7 and 8 being achieved by applying a layer of resin-treated glass-fibre to the joint 21 where the depending wall of section 7 beds on to a marginal portion of section 8 (see FIGURE 3).

The space 10 formed as above described affords accommodation for fitting a lamp bulb 22 into the lampholder 14 by way of a gap formed in the section 7. A translucent or transparent window plug 23 is inserted as a frictional fit into the space 10. The space 11 formed as above described accommodates a mercury-switch element. This mercury-switch element comprises a body 24 fitted with a mercury switch 25 having an inclined disposition with respect to the longitudinal axis of said body. The body 24 is made of insulating material and at one end, i.e. the end which is to be inserted via the tunnel 20, the said body has a pair of sockets 26 for receiving pins 27 which project from the connector block 13. The length of body 24 is such that when the pins 27 are in position in the sockets 26, a flange 28 on the body 24 beds on to the outer surface of the rear edge of section 7, this flange being secured to said section 7 by fixing screws. The body 24 has screws 29 for anchorage of the respective wires of a flexible feed cable 30. One of the screws 29 is directly connected to one of the sockets 26; the mercury switch 25 is interposed in an electrical connection from the other screw 29 to the remaining socket 26.

The inclined disposition of the mercury switch 25 with respect to the body 24 is such that when the seat cover 5 has a raised position as shown in broken lines in FIGURE 2, the said mercury switch interrupts the circuits feeding the heating element 6 and indicator lamp 22, whereas said mercury switch establishes these circuits when the seat cover 5 is lowered to rest on the seat 1. Thus the heating element 6 will be energised to warm the seat cover 5 when the latter is in its lowered position, the heating element remaining in operation until the thermostat 18 effects cut-off. The seat 1 becomes warmed by conduction, convection and radiation of heat from the seat cover 5.

By reason of the fact that the thermostat 18 can be withdrawn (together with the adjacent portions of leads 17 and 19 connected thereto) by way of the tunnel 20, facility is afforded for inspecting said thermostat or for substituting a fresh one should the need arise.

The apparatus includes a transformer 31 for connection to supply mains, this transformer having a low-voltage output fed to the seat unit by the cable 30.

Instead of building up the seat cover in the manner aforesaid from two sections 7 and 8 bonded together, with the parts 6, 13, 14 and 15 initially secured to section 8, the said seat cover may be formed as a one-piece moulding in synthetic plastics material, the parts 13, 14, 15, 16, 17, 18, and 19 becoming embedded in the body formed in this way. In this case the thermostat 18 will be a fixture within such moulded body, and the mould employed will have removable cores for forming the spaces 10, and 11. Production in this manner can be satisfactorily carried out by normal compression moulding, a layer of the powdery mouldable substance initially being laid on the base of the mould if necessary, but other moulding methods may be used. Or, a pre-formed plate corresponding to section 8 could be initially laid in the base of the mould, the parts for enclosure being arranged thereon and the remainder of the seat cover formed by moulding a body on to such assembly.

I claim:

1. A toilet-pan seat unit incorporating a seat and a seat-warming raisable rigid seat cover hingedly carried by a mounting associated with said seat, an electric heating element incorporated with said seat cover, said heating element being embedded in a hard-setting mouldable substance, an electrical connector detachably fitting into said seat cover, said connector establishing electrical connection to said heating element, and a mercury switch incorporated with said electrical connector, said switch being arranged to switch on said heating element by lowering said seat cover.

2. A toilet-pan seat unit as claimed in claim 1 including a thermostat, incorporated with said cover, for controlling said heating element, said seat cover having a cavity which accommodates said thermostat and said electrical connector.

References Cited in the file of this patent

UNITED STATES PATENTS

| | | |
|---|---|---|
| 1,058,270 | Stephens | Apr. 8, 1913 |
| 2,247,337 | Raflovich | June 24, 1941 |
| 2,458,019 | Niles | Jan. 4, 1949 |
| 2,593,087 | Baggett | Apr. 15, 1952 |
| 2,648,758 | Kroll et al. | Aug. 11, 1953 |
| 2,706,767 | Packchanian | Apr. 19, 1955 |
| 2,717,953 | Brandi | Sept. 13, 1955 |
| 2,972,034 | Easley | Feb. 14, 1961 |

FOREIGN PATENTS

| | | |
|---|---|---|
| 547,989 | Italy | Sept. 17, 1956 |